United States Patent [19]
Ehrat

[11] 3,753,617
[45] Aug. 21, 1973

[54] METHOD OF AND APPARATUS FOR COMPARING ONE ARTICLE WITH ANOTHER SIMILAR ARTICLE

[75] Inventor: Kurt Ehrat, Zurich, Switzerland

[73] Assignee: Gretag Aktiengesellschaft, Regensdonf, Switzerland

[22] Filed: Feb. 18, 1972

[21] Appl. No.: 227,387

[30] Foreign Application Priority Data
Feb. 26, 1971 Switzerland ........................ 2904/71

[52] U.S. Cl. ............ 356/71, 250/219 DQ, 356/167, 356/168
[51] Int. Cl. ........................ G01k 9/08, G01b 11/24
[58] Field of Search ...................... 356/71, 165, 167, 356/168, 203; 250/219 DQ

[56] References Cited

UNITED STATES PATENTS

| | | | |
|---|---|---|---|
| 3,496,371 | 2/1970 | Endo | 356/168 |
| 3,546,377 | 12/1970 | Troll | 356/168 |
| 2,827,822 | 3/1958 | Timms | 250/219 DQ |
| 3,636,254 | 1/1972 | Johnston | 356/167 |
| 2,898,801 | 8/1959 | Rockafellow | 356/168 |

*Primary Examiner*—Ronald L. Wibert
*Assistant Examiner*—Vincent P. McGraw
*Attorney*—Ralph E. Parker et al.

[57] ABSTRACT

A method and apparatus for comparing one article with another similar article, the article being for example documents or bank notes to detect forgeries or discrepencies. The method comprises scanning with a beam of light a randomly selected discrete area of a document under examination, a corresponding discrete area of a standard document and correlating the values obtained from light reflected from the scanned areas to obtain a value indicating substantial identity of the areas. Preferably more than one area is scanned and the position of each area to be scanned is selected in a random fashion and the correlation values obtained for each of the corresponding areas scanned indicating whether or not the document under examination is genuine. Apparatus is also provided for carrying out the above method and comprises in one form a support for the document under examination and the standard document which is moved continuously in one direction and randomly in another direction orthognal to the one direction, a scanner being provided over each document to scan the aforementioned corresponding discrete areas.

24 Claims, 8 Drawing Figures

METHOD OF AND APPARATUS FOR COMPARING ONE ARTICLE WITH ANOTHER SIMILAR ARTICLE

FIELD OF THE INVENTION

This invention relates to a method and apparatus for automatically testing whether articles such as printed paper, documents, bank notes or the like, are genuine.

PRIOR ART

It is possible to scan a zone of a paper under test to determine a particular property and then convert the result into an electrical signal and compare it with a signal obtained by scanning a corresponding zone of a standard document. The following properties, in particular, have proved suitable for such a comparison: image content, transparency, surface roughness, document thickness and the nature of the paper. It has been found that, in particular, the image content can provide extensive data. In one previous proposal only a zone comprising a single line of the document under test is examined for its image content. This zone remains constant for a relatively long period and in consequence forgeries cannot always be recognized as such because the single zone which is tested remains the same over that period.

The invention seeks to obviate this disadvantage by testing each zone in accordance with random laws for each test.

BRIEF SUMMARY OF THE INVENTION

One form of apparatus for carrying out the method of the invention comprises a document carrier, on to the document area of which there is directed a beam of light from a scanner which delivers an electrical signal to the first input of a correlator, the second input of which receives an electrical signal obtained from a standard document, the document carrier and the scanner being displaceable relatively to one another along two orthogonal directions by means of an x-motor and y-motor respectively, one of the two motors being random-controlled.

Preferred embodiments of the invention will now be explained in detail with reference to the accompanying drawings wherein.

DETAILED DESCRIPTION OF PREFERRED EMBODIMENTS

Figure 1:
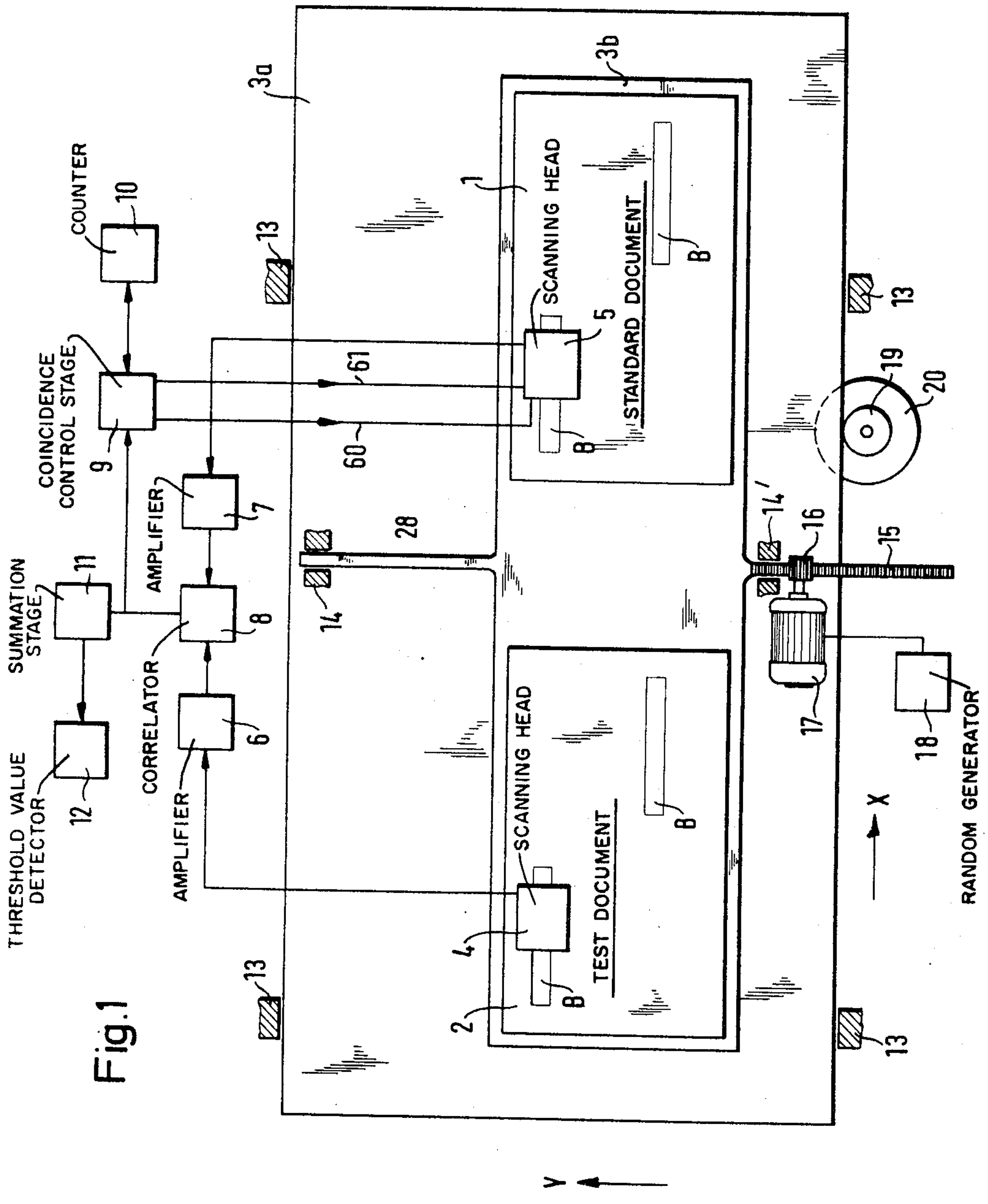
FIG. 1 is a diagrammatic plan view of one embodiment of apparatus according to the invention.

The apparatus illustrated in FIG. 1 comprises a baseplate *3a* mounted for displacement in the direction of arrow X, and a document carrier *3b* mounted on the baseplate and displaceable in the direction of arrow Y. The directions X and Y are orthogonal and are referred to hereinafter as the x-direction and y-direction respectively. Like the baseplate, the document carrier *3b* is of rectangular shape and at one of its two longitudinal edges has a guide bolt 28 which is guided in a plain bearing 14 mounted on the baseplate *3a*. A rack 15 mounted at the other longitudinal edge of the document carrier *3b* and guided in a bearing 14' mounted on the baseplate *3a*, is engaged by a gearwheel 16 driven by a stepping motor 17. The document carrier *3b* is displaceable in the y-direction by switching on the stepping motor 17 which is controlled by a random generator 18. The baseplate *3a* is mounted in four bearings 13, which are illustrated diagrammatically, and is displaceable in the x-direction by a friction disc 19 adapted to be driven by a motor 20. The document carrier *3b* contains a mounting (not shown) for the document 2 which is to be tested, and also a mounting for the standard document 1 used for comparison purposes. The scanning head 5 scans standard document 1, and the scanning head 4 scans the document 2 under test, each scanning head having a photo-electric device associated therewith. The two scanning heads are so disposed that they each scan identical areas of the two documents and are able to scan the entire area of the two documents 1 and 2 on displacement of the baseplate and document carrier. The signals produced by the scanning process are fed by the scanning heads to amplifiers 6 and 7. The output of each of these amplifiers is connected to the input of a correlator 8, in which the signals obtained from scanning the two documents 1 and 2 are compared. The output of the correlator 8 is connected, on the one hand, to a summation stage 11, which is connected to a threshold value detector 12, and on the other hand to a coincidence control stage 9, which is connected to a counter 10. Stage 9 is connected to scanning heads 4 and 5 via leads 60 and 61 respectively.

Figure 2:
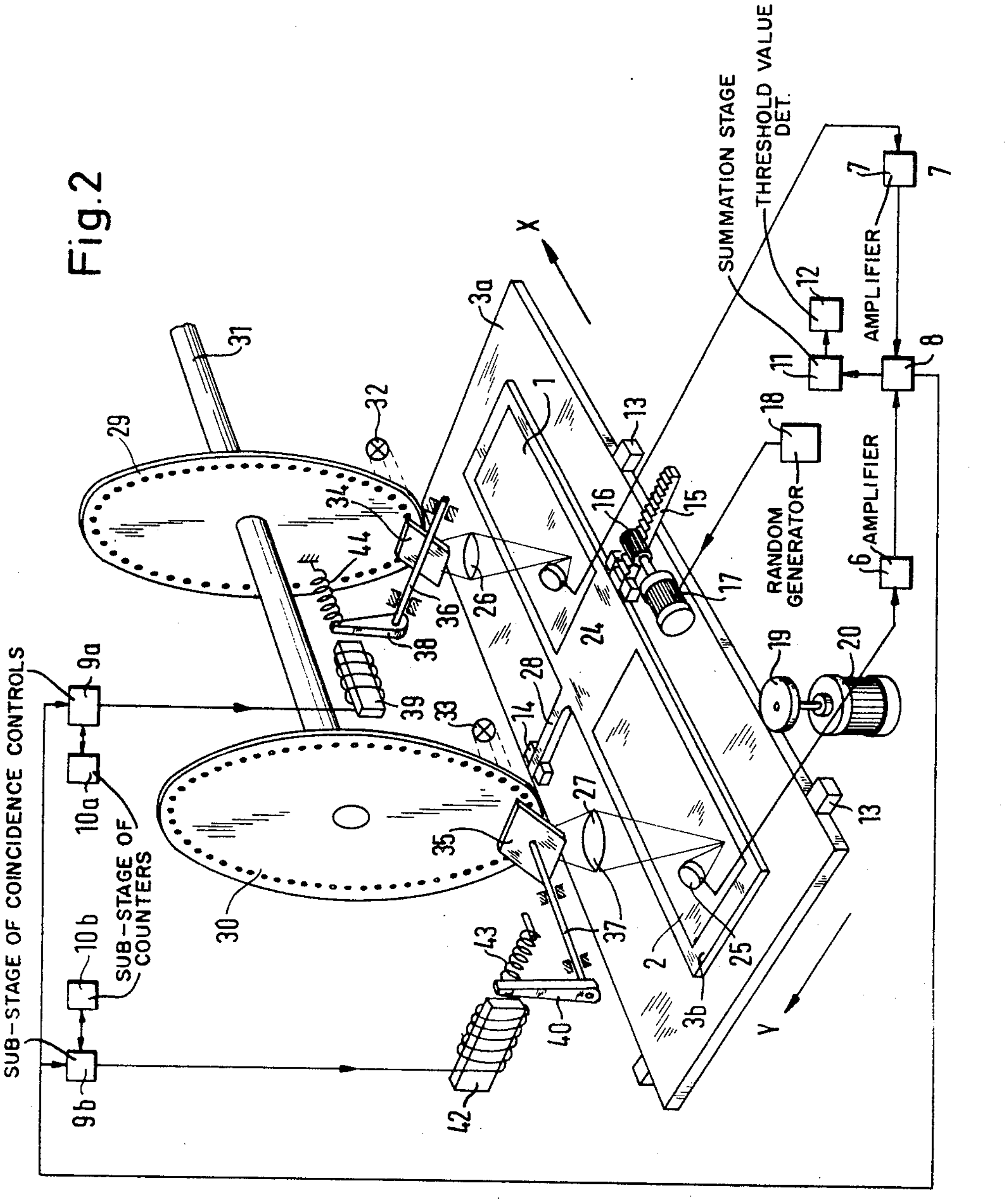
FIG. 2 is a perspective view in detail of the document support and scanners of the apparatus shown in FIG. 1.

Referring to FIG. 2, the scanning heads 5 and 4 (FIG. 1) include a light source 32, 33, an apertured disc 29, 30, a reflecting mirror 34, 35, a lens 26, 27, and a photo-detector 24, 25 respectively. The discs 29, 30 are each slotted or perforated, both being mounted on a common shaft 31. The latter is adapted to be driven by a motor (not shown). The reflecting mirrors 34 and 35 are each secured to a spindle 36, 37 respectively. The two spindles 36 and 37 are aligned perpendicularly to one another, the spindle 36 being in the y-direction and the spindle 37 in the x-direction. Both spindles are mounted for rotation and one end of each spindle carries an armature 38, 40. Associated with these two armatures are magnets 39 and 42, each energised by the coincidence control stage 9. As a counteracting force to the two magnets, each arm 38, 40 is engaged by a spring 44, 43 respectively. The coincidence control stage 9 has two sub-stages *9a* and *9b*. Sub-stage *9a* is associated with the x-direction and sub-stage *9b* with the y-direction. The counter 10 in FIG. 1 also has two sub-stages, *10a* and *10b* coupled to sub-stages *9a* and *9b* respectively.

The apparatus described operates as follows: to check whether a document 2, for example a bank note, is genuine, the document 2 and the standard document 1 are placed in the mountings on the document carrier *3b*. The document carrier is then displaced in the y-direction by means of the stepping motor 17 controlled by the random generator 18, until the document carrier reaches a position selected by the random generator.

The latter generates random pulse series, the maximum number of pulses corresponding to the maximum possible number of scanning zones in the y-direction and the maximum extent of the document under test in the y-direction. If, for example, 128 scanning zones are possible per document, this being equivalent to a displacement of about 0.5 mm for each zone in the case of a document width of 60 mm, then the maximum number of pulses is also 128; the pulse transmission from the random generator could in that case be effected with a 7 digit binary counter, the individual counting stages of which are set up at random. Security against forgeries in this case is not very high, since given a faithful imitation of a scanning zone the probability that such forgery will be assessed as genuine is 1: 128. Consequently, each document is scanned not over just a single scanning zone, but preferably over a plurality of zones, for example four. Given four scanning zones selected at random per document, the probability that four preselected zones will be scanned is 1: $128^4$. The two scanning heads 4 and 5 may be fixed or be adjustable for accurate establishment of coincidence between the positioning of the two documents. Alternatively, it is sufficient for one of the two scanning heads to be fixed and the other adjustable. At the start of the test operation, the two scanning heads are at one of the edges of the associated document, for example the right-hand edge. After the document carrier 3*b* has been positioned in the y-direction, the baseplate 3*a* is then moved continuously by the friction disc 19 in the directions of arrow X. When a plurality of zones is scanned per document, the document carrier 3*b* is moved, after each given movement in the x-direction, into the next zone selected by the random generator 18, and so on. In the next zone, scanning starts approximately at the x-value at which it terminated in the preceding zone. In principle, it would be sufficient for the scanning zones to represent lines in the y-direction. It has been found, however, that extremely little information is available in that case for the comparison between the two documents. For this reason, rectangular zones B (FIG. 1) are scanned, which are oriented with their longitudinal sides parallel to the x-direction. The rotating discs 29, 30 (FIG. 2) produce a travelling spot of light which scans the two documents 1 and 2 in the rectangular zones B along lines situated substantially in the y-direction. As each aperture passes through one of the beams emitted by the light sources 32, 33 and the beam diameter at each disc is arranged to be a multiple of the diameter of each aperture in the disc, the discs produce a spot of light travelling along an arc. The width of these arcs is equivalent to the diameter of the apertures in the discs, while the arc length is dependent upon the beam diameter. Since the radias of these arcs is very large in comparison with their length, an approximately straight line oriented in the y-direction is produced on each of the two documents, and a spot of light scans each of the documents along said approximately straight line. Given continuous transport movement of the baseplate in the x-direction, these lines are not situated exactly in the y-direction, but at an angle thereto. After an aperture has passed through the beam, the two beams are masked by that part of the discs between the apertures. When the next aperture in the discs passes through the beam, the travelling spot of light scans the documents along a new line in each case, this line being in the y-direction and spaced in parallel relationship to the previous line, and so on. The rectangular zones B of the two documents are scanned line-wise in this way. The scanning of the documents 1 and 2 in lines extending in the y-direction results in voltages forming at the outputs of the two photodetectors 24, 25 respectively, the values of said voltages corresponding to the image content or tone distribution along each scanning line. If the distance between the scanning lines is approximately 0.05 mm, and if the individual scanning rectangles B are approximately 50 mm long, one thousand lines have to be scanned. Given a speed of the shaft 31 equivalent to 3,000 rpm, and 40 apertures per disc, a rectangle can be scanned in half a second. If the distance between the apertures on the disc is 2 mm, then the circumference is 80 mm and the disc diameter is less than 30 mm. The scanning voltages obtained at the outputs of the photodetectors 24, 25 are fed to the amplifiers 7 and 6 and from the latter to the correlator 8 where the individual scanning voltages are compared with one another.

Figure 3:
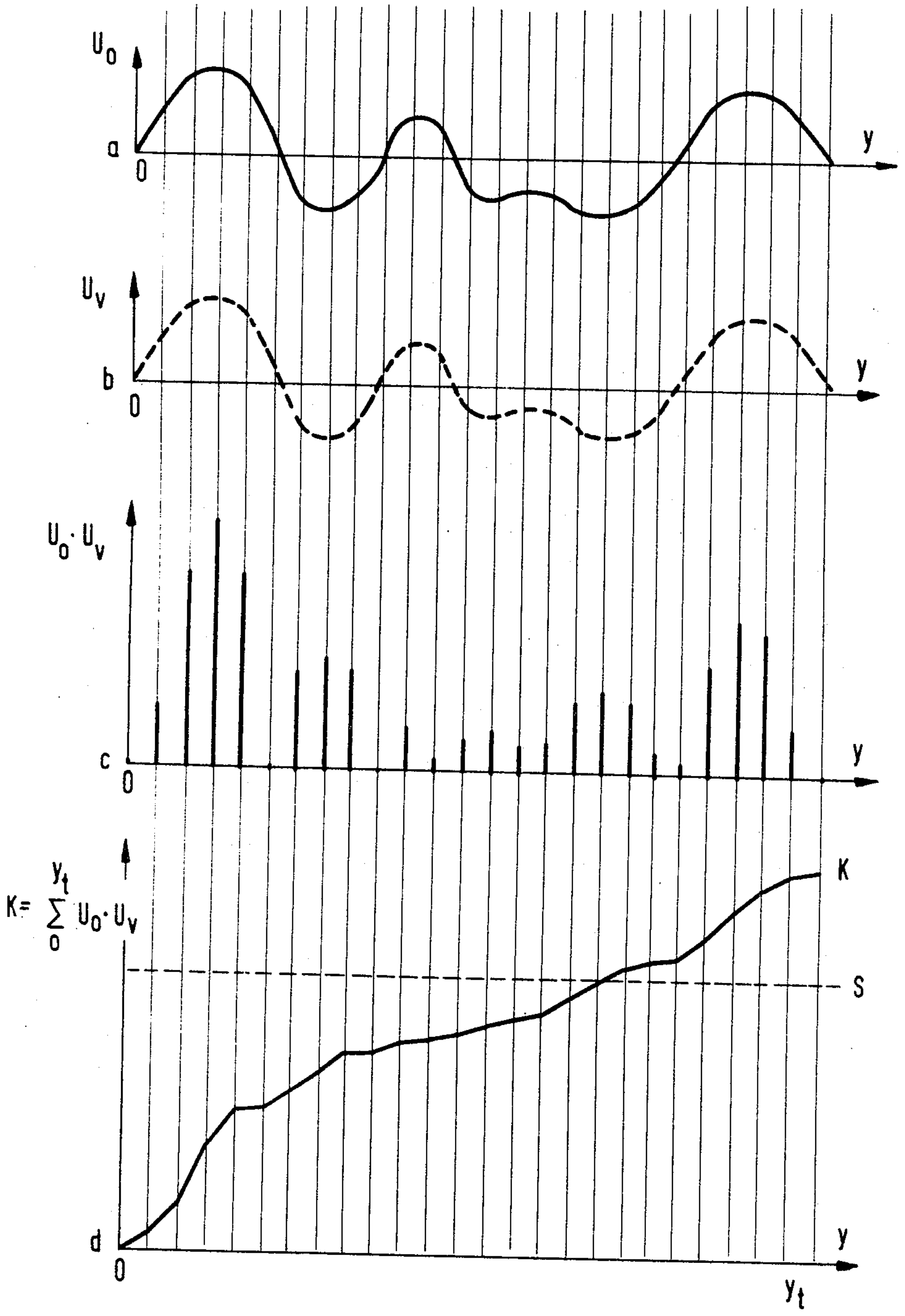
FIGS. 3 and 4 are graphs illustrating the signals and mode of scanning of the scanners shown in FIG. 2.

FIG. 3 shows the principle of operation of correlation comparison. Line *a* shows the scanning voltage $U_o$ for a line of the standard document 1, line *b* shows the scanning voltage $U_V$ for a line of the document 2; the two voltages are shown as a function of the distance *y*, i.e. of the line length $y_t$. These voltages, which represent a constant function over a line in each case, are broken down into discrete voltage pulses in the correlator 8. Each of these discrete voltage pulses corresponds to a given scanning point irrespective of the fact that scanning is carried out continuously along each line. The distance between the individual scanning points depends upon the resolution of the system and, for example, is made 0.05 mm. The individual discrete voltage pulese are summed as shown at line *c*. In the example illustrated, the discrete voltage pulses of the scanning voltages $U_o$ and $U_v$ have the same sign for each scanning point, i.e., all the voltage pulses are greater than or equal to zero. Line *d* shows the correlation value *K* of the two functions of line *a* and *b*, i.e.

$$K=\sum_{0}^{Y_t}(U_o \cdot U_V).$$

In this case, the correlation value is a function increasing with the distance *y*.

Summation of the function products, i.e. formation of the correlation value, is carried out in the summation stage 11. The higher the correlation value *K*, the better the agreement between the two documents 1 and 2 in the scanning zone. Since the surfaces of bank notes become dirty as a result of continuous use, a relatively low degree of agreement, i.e. a correlation value lower than the maximum attainable value, is satisfactory in practice, and can be marked, for example by a threshold value S as shown on line *d*. This threshold value is stored in the threshold value detector 12 (FIGS. 1 and 2). Thus if the threshold value S is reached in a correlation zone from 0 to $y_t$ the document under test is regarded as genuine.

For this correlation method to be carried out logically, the scanning signals must be correlated to one another in the same phase position or, in other words, the two documents must each be in exactly the same geometric position with respect to their associated scanning system. With the selected line spacing of 0.05 mm, and with the same distance between scanning points in the line direction, a relative shift between the two documents 1 and 2 of the order of just fractions of the line or scanning point spacing is usually sufficient to prevent the threshold value from being reached in the correlation zone. To obviate this, the two documents 1 and 2 must be brought into the same relative position to their scanning systems before the start of the correlation operation. The coincidence control stage 9 (FIGS. 1 and 2) is used for this purpose and provides compensation for any deviations in the x and y-direction, angle deviations and distance variations between corresponding image points.

Assuming that the length of a scanning line is not so great that distance variations between corresponding image points in a line reach the order of magnitude of the distance between scanning points, and assuming that the scanning raster of the scanning zones is made fine enough, then given a constant advance of the documents in the x-direction, angle deviations can be compensated by correction shifts in the y-direction. Distance variations between corresponding image points have no effect under the above assumptions. For example, if the distance between two scanning points is 0.05 mm, and if this distance is increased by one percent, this effect has no influence given a line length of 0.5mm corresponding to 10 scanning points, since there is only a length of 0.005 mm for the total distance variation between the two line end points. Given a line length of 5 mm, the result is 10 times as much, i.e. the distance between the scanning points. With the selected scanning line length of a few millimetres, or in other words with the selected width of the scanning rectangles and the selected scanning raster, the coincidence control system is required only to compensate for deviations in the x and y-directions.

Figure 4:
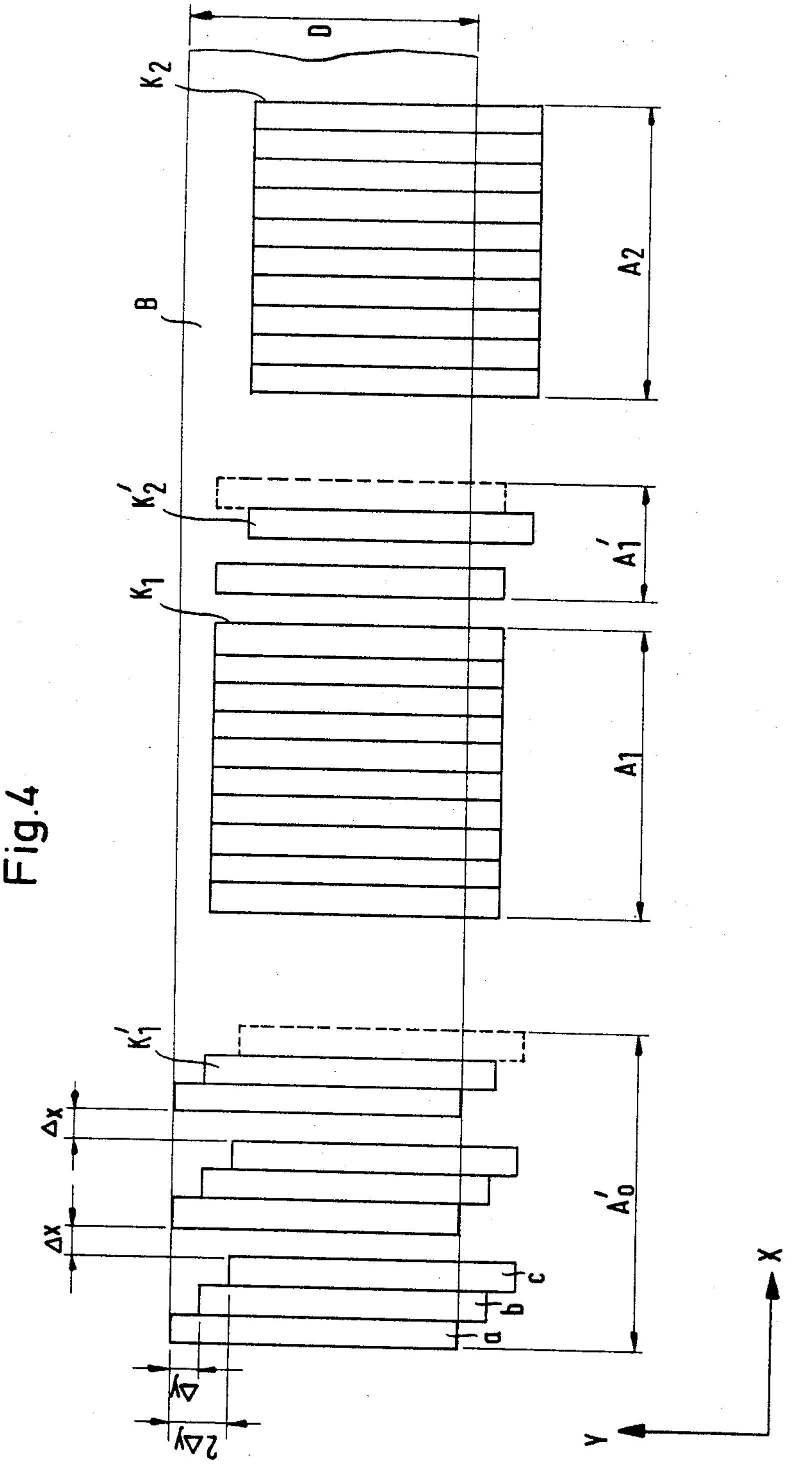

Referring to FIG. 4, each scanning zone (scanning rectangle B) of a width D is divided up over its length into a number of scanning intervals $A'_o$, $A_1$, $A'_1$, $A_2$ and so on. At the start of each test for genuineness, a search is made for the optimum positioning of the standard document relative to the document under test by a systematic search operation on the standard document in the x-direction and in the y-direction. To this end, the first line *a* is scanned and the correlation value is determined. The second line *b* is then scanned, the relative position between the standard document and the scanning head being shifted in comparison with the first line by an amount equivalent to the scanning point distance $\Delta y$, and finally the third line *c* is scanned, the relative distance between the standard document and the scanning head being shifted by $2\Delta y$ in comparison with the first line. The relative position is then shifted in the x-direction by the line spacing $\Delta x$, and the line correlation is again carried out with three starting positions each shifted by $\Delta y$. The relative positions are finally shifted by the amount $2\Delta x$ in the x-direction as compared with the first line and the line correlation is again carried out with three starting poistions shifted by $\Delta y$. Thus in the scanning interval $A'_o$ the correlation is carried out in all possible relative shift combinations from $0\Delta x$ to $2\Delta x$ and from $0\Delta y$ to $2\Delta y$. In practice, a large number of shifts have to be carried out. If, for example, the maximum coincidence error is 0.5 mm and if the magnitude of the shift steps $\Delta x$ and $\Delta y$ is in each case half the value of the scanning point and line spacing, i.e. 0.025 mm, 20 shift steps must be carried out in each direction, giving 20.20 = 400shift combinations. During this search process, the maximum correlation value $K'_1$ and the $\Delta x$ and $\Delta y$ starting position of that line in which this correlation value would be reached, are stored. On completion of the scanning operation, the relative position between the standard document and the scanning head is adjusted to this stored starting position. In the next scanning interval $A_1$, the scanning lines commence at the new starting position within the above-described search operation, and the correlation value $K_1$ for the scanning interval $A_1$ is determined. Since slight deviations may occur between the relative positioning of the two documents, a coincidence control search operation is carried out in the interval $A'_1$, but as a rule it will be much shorter than the first search operation in the interval $A'_o$, since only small shifts are expected in $A'_1$ compared with $A'_o$. The search operation is the same as described above, and the stored maximum correlation value will be $K'_2$. Scanning is then carried out in the interval $A_2$ with the starting position corresponding to the correlation value $K'_2$, and the correlation value $K_2$ is determined, and so on. The correlation values $K'_1$, $K'_2$ and so on are fed to the coincidence control circuit 9 as shown in FIG. 1. The starting position corresponding to the maximum correlation value determined on each occasion is retained and stored by the counter 10. The coincidence control circuit 9 produces the relative shifts between the documents and the associated scanning heads. The correlation values $K_1$, $K_2$ etc of all the scanning intervals are added in the summation stage 11. At the end of the scanning operation, the sum of the correlation values is compared with the threshold value preset in the threshold value detector 12. If the sum of the correlation values is greater than this threshold value, the document is assessed as genuine.

In the apparatus illustrated in FIG. 2, the coincidence control stage 9 has two sub-stages 9*a* and 9*b*. Stage 9*a* rocks the mirror 34 about the axis 36 to produce a coincidence correction in the x-direction, whilst stage 9*b* rocks the mirror 35 about the axis 37 to produce a coincidence correction in the y-direction, triggering and control of the mirror rocking movements being obtained by means of the magnets 39 and 42 controlled by the sub-stages 9*a* and 9*b* respectively. The control current values for the magnets are retained in digital form in the counters 10*a* and 10*b*. Each coincidence control shift by the amount $\Delta x$ is equivalent to a current increment for the magnet 39 while each coincidence control shift by $\Delta y$ is equivalent to a current increment for the magnet 42. In this way, the relative position between the heads and the documents are, in each case, reset by increments, so that after the search operation it is possible before each scanning interval (FIG. 4) to return to the position corresponding to the maximum correlation value.

Figure 5:
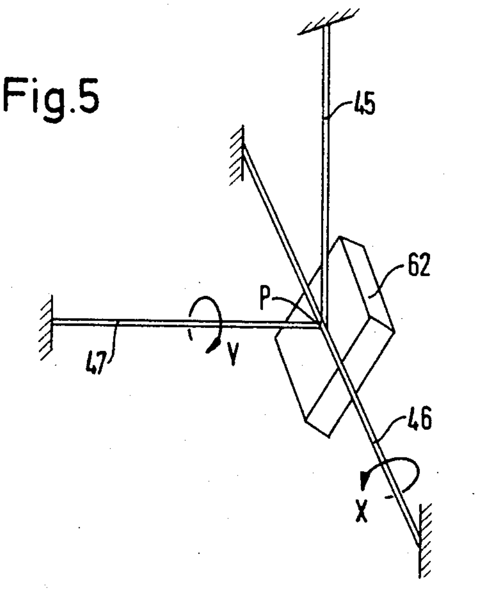
FIG. 5 is a detail view of a support structure for a scanner mirror.

Referring to FIG. 5, coincidence control for both directions is carried out with just one mirror. A mirror 62 is secured at its suspension point P to three non-rigid suspension wires 45, 46 and 47. The three suspension wires are perpendicular to one another. The mirror can be rocked through small angles both in the direction of the arrow X about the wire 46 and in the direction of the arrow Y about the wire 47.

Figure 6:
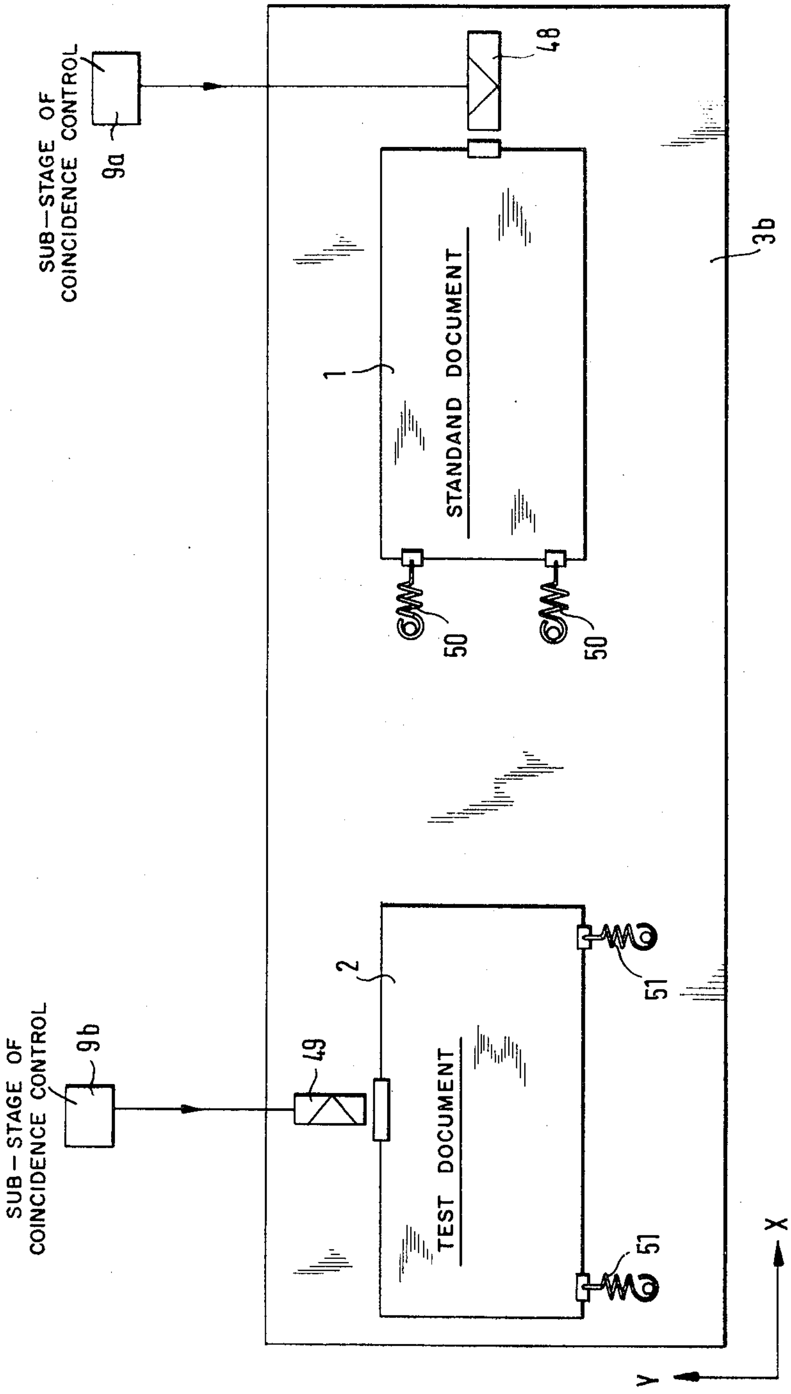
FIG. 6 is a detail view of a document support similar to that illustrated in FIG. 1.

Referring to FIG. 6, the relative movement between the document and scanning device may also be carried out by shifting the documents. Referring to the drawing, the documents are clamped resiliently at one edge and are subjected to the action of a magnet at the opposite edge. The document 2 under test is displaceable in the y-direction against the action of the springs 51 by means of the magnet 49 controlled by the coincidence control stage 9*b*, and the standard document 1 is displaceable in the x-direction against the action of the springs 50 by means of the magnet 48 controlled by the coincidence control stage 9*a*.

The automatic fine positioning processes described presuppose that there has previously been a rough positioning of the documents. Rough positioning of this kind can be carried out without difficulty by means of stops or the like to an adequate accuracy of ± 0.5 mm.

For some applications it is convenient to determine and then store all the significant values representing the surface reflectivity of the standard document instead of comparing it directly with the document under test. Systems of this type are not fundamentally different from the systems described herein; they can be obtained from the latter systems by simple modifications.

Figure 7:
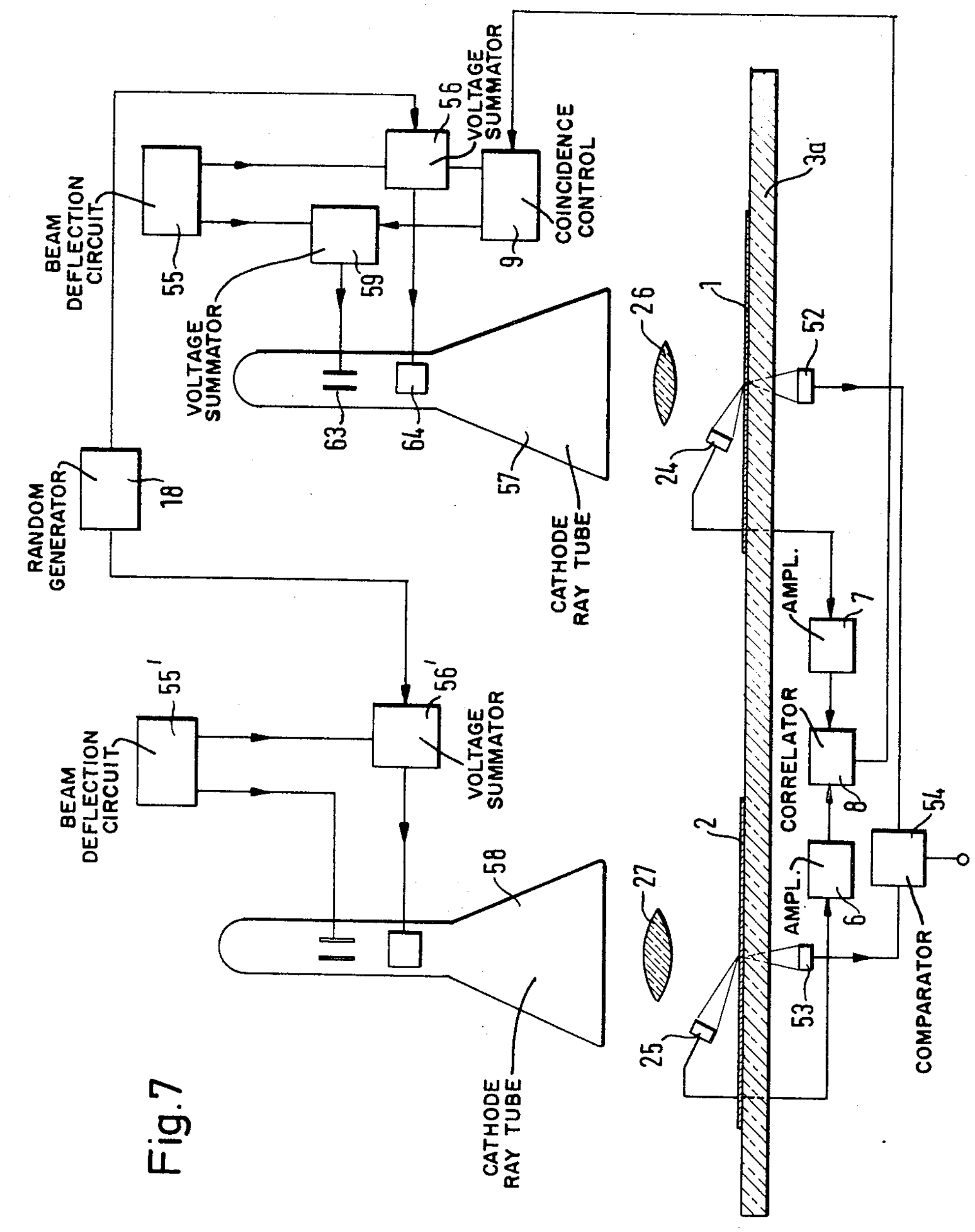
FIG. 7 is a side elevation of a second embodiment of apparatus similar to that shown in FIG. 1.

Referring to FIG. 7, the documents may also be scanned by means of a flying spot scanning tube, for example a cathode ray tube without afterglow. Unlike the apparatus illustrated in FIGS. 1 and 2, in which the travelling light spot is produced mechanically, it is produced electronically and the standard document 1 and the document 2 under test are each scanned by a flying spot scanning tube 57, 58 respectively. The two documents are fixed on a baseplate 3*a* arranged for displacement in the x-direction. The line scanning movement in the y-direction is effected by the cathode ray tubes. The coincidence control in this case is fully electronic and requires to be carried out by only one of the tubes, i.e. tube 57 in the drawing. The control values obtained by correlation in the correlator 8 are fed to the coincidence control circuit 9. The coincidence errors are fed in the form of additional deflection voltages to a voltage summator 56 for the y-direction and to a voltage summator 59 for the x-direction, where they are added to the deflection voltages obtained from the beam deflection circuit 55 and are fed to a pair of plates 63 (x-direction) and a pair of plates 64 (y-direction). Random selection of the scanning zones is effected by a random generator 18, which delivers a random d.c. voltage to the voltage summators for the y-direction 56 and 56'. The beam deflection circuit of the tube 58 bears the reference 55'. It would be possible for electronic scanning to be carried out at a speed such that a scanning interval consists only of a single line, so that a new coincidence control is carried out for each line. The line length can also be made very small; in the extreme case it can be equivalent to just a single scanning point. In the latter case scanning is one-dimensional, i.e. in the x-direction.

The image content can also be determined by measuring the transmitted light instead of the reflection measurement described hereinbefore. Also, the transmitted light and the reflected light may be measured simultaneously. FIG. 7 illustrates an arrangement of this kind. The baseplate 3*a* is transparent. The transmitted light is picked up by photoelectric cells 52 and 53. The transmitted light values of the two documents are compared with one another in a comparator 54.

Other properties of the documents, for example surface roughness and thickness, may be compared in the selected areas. Also, a plurality of scanning heads with different colour filters can be used to compare the colour of the document under test with that of the standard document. If two of these properties are to be determined simultaneously, only a second pair of scanning heads and an additional correlator, an additional summating network and an additional threshold value detector are required for these purposes.

Figure 8:
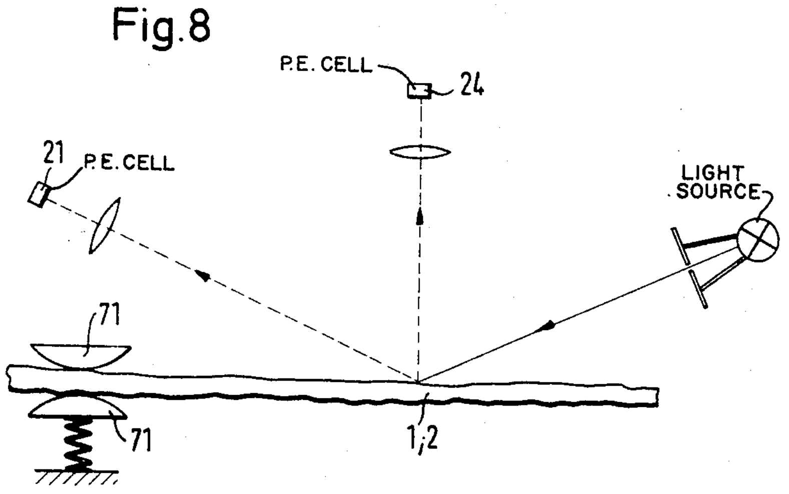
FIG. 8 shows in simplified form means for detecting the surface texture of a document.

Referring to FIG. 8, the surface roughness can be determined by a scanning beam incident to the surface at an acute angle, the surface projections and depressions which form the roughness throwing shadows which are detectable by a photoelectric cell 24. The proportion of light reflected in accordance with the laws of reflection can be measured by means of an additional photoelectric cell 21 and also be used for comparison purposes. A mechanical sensing member 71 for thickness measurement may be used as is illustrated diagrammatically.

Although two cathode ray tubes have been illustrated and described for producing scanning spots for the two documents, a simple double beam tube may be used in conjunction with an optical system to project the two beams onto the two documents.

Likewise only one disc need be used instead of two as illustrated in FIG. 2, the scanning spot produced by a single rotating disc being split and projected via the mirrors 34 and 35, and lenses 26 and 27 onto the documents 1 and 2 respectively.

I claim:

1. A method of comparing a property of like articles comprising, randomly selecting at least one discrete area of one article, scanning the selected area to provide information pertaining to a predetermined property of the scanned area, providing information pertaining to said predetermined property of an area of another article corresponding in position and area to the scanned area of said one article, and comparing the information relating to the corresponding discrete area on both articles to determine the degree of similarity in said predetermined property.

2. A method according to claim 1 wherein the discrete area on said one article is scanned by a beam of radiation and radiation modified by the predetermined property of that discrete scanned area is received and converted into an electrical signal and wherein the information pertaining to said predetermined property of the corresponding discrete area on said other article is provided as an electrical signal.

3. A method according to claim 2 wherein said signals each comprise a plurality of signal values each value representing the property of a different portion of an area and wherein the signal values representing corresponding areas in the one and other of said articles are summed to produce a correlation value, said method further including producing a signal indicative of the similarity between the properties of the areas when said correlation value exceeds a predetermined threshold value.

4. A method according to claim 3 wherein the corresponding areas of said one and said other articles are rectangular and scanning of the rectangular area of said one article is effected by relative displacement of said beam of radiation and said one article in longitudinal and transverse directions of said rectangular area.

5. A method according to claim 4 wherein said one article is moved relative to said beam of radiation in a direction parallel to the longitudinal axis of said rectangular area and said beam is moved in a direction substantially transverse to said longitudinal axis and wherein said beam is obscured during the fly-back time between one transverse scan and the next.

6. A method according to claim 5 including providing a second beam of radiation, scanning said area on said other article, receiving radiation modified by the predetermined property of that discrete scanned area and converting it into the electrical signal representing said predetermined property of that area.

7. A method according to claim 6 including simultaneously moving both articles in said longitudinal direction and said first mentioned and second beams of radiation in said transverse direction to scan the corresponding areas on said articles to provide a first correlation value, shifting the relative positioning of one of said beams to the article scanned by that beam for scanning a different area on that article, again simultaneously moving both said articles and scanning said area and said different area to provide a second correlation value, repeating the shifting of one of said articles relative to the beam scanning that article and deriving further correlation values to determine the maximum correlation value between scanned areas in the two articles and then moving one article relative to the other to a position at which the maximum correlation value is obtained.

8. A method according to claim 7 wherein each area is scanned in a transverse direction line by line and each said correlation value is produced for each line scanned.

9. A method according to claim 1 wherein said articles are documents and said beam of radiation comprises a light beam.

10. Apparatus for comparing a property of like articles comprising a carrier for supporting at least one of said articles; first means for moving said carrier in a first direction; a scanner for scanning a discrete area of said one article and deriving a first signal representing the property of that area; second means for producing random movement between said carrier and thereby said one article and said scanner in a second direction orthognal to said first direction, means for providing a second signal representing the property of a discrete area on another like article, which area substantially corresponds in position to the area on said one article; and correlation means for correlating said first and second signals and thereby provide an indication of the similarity between the properties of said corresponding discrete areas.

11. Apparatus according to claim 10 wherein said first and second means include first and second motors for moving said carrier along X and Y orthognal axes respectively, and random control means for causing random movement of said second motor.

12. Apparatus according to claim 11 wherein said first motor runs continuously during scanning of said discrete area on said one article.

13. Apparatus according to claim 11 including means for stopping said first motor when said second motor moves in a random fashion and then starting said first motor when the second motor is stopped.

14. Apparatus according to claim 11 wherein said second motor comprises a stepping motor and random control means which causes said motor to step a random number of steps each time said motor is energised.

15. Apparatus according to claim 10 wherein said scanner comprises a light source; a mirror; a rotating disc interposed between said source and said mirror and having a plurality of equidistant apertures located about its periphery, each aperture having a width measured along said periphery less than that of the beam of light produced by said source; and a photoelectric device receiving light from said source as modified by the property of said discrete area.

16. Apparatus according to claim 15 wherein said scanner further includes means pivoting said mirror in one of said first or second directions thereby shifting the position of the scanning beam produced by rotation of said disc, said pivoting means being controlled by said correlation means.

17. Apparatus according to claim 15 wherein said carrier includes means for supporting said one and said another article and said apparatus further includes a second scanner for scanning said corresponding area of said another article to provide said second signal.

18. Apparatus according to claim 17 wherein said second scanner comprises a second light source, a second mirror, a second rotating disc interposed between said second source and said second mirror and having a plurality of equidistant apertures located about its periphery each aperture having a width measured along said periphery less than that of the beam of light produced by said second source; and a second photoelectric device receiving light from said second source as modified by the property of said corresponding discrete area on said another article.

19. Apparatus according to claim 18 including a common shaft mounting said first mentioned and second discs and a motor driving said shaft at a constant speed, said first mentioned scanner including first means pivoting said mirror in said first orthognal direction and said second scanner including second means pivoting said mirror in said second orthognal direction, said first and second means being controlled by said correlation means.

20. Apparatus according to claim 10 in which said scanner comprises a cathode ray tube and deflection circuits for producing a beam of light which is scanned over said discrete area and a photoelectric device receiving light from said cathode ray tube as modified by the property of said discrete area.

21. Apparatus according to claim 20 wherein said carrier includes a support for supporting said one and said another article and said apparatus further includes a second scanner for scanning said corresponding area of said another article to provide said second signal.

22. Apparatus according to claim 21 wherein said second scanner comprises a second cathode ray tube and associated deflection circuits for producing a beam of light which is scanned over said discrete area and a second photoelectric device receiving light from said second cathode ray tube as modified by the property of said corresponding discrete area on said another article.

23. Apparatus according to claim 22 wherein said first means comprises a motor adapted for continuous running during scanning of said one and another articles and said second means includes a random signal generator coupled to the deflection circuits of said first and second cathode ray tubes to effect a shift in the position of the scanning on the one and another articles.

24. Apparatus according to claim 10 wherein said articles are documents.

* * * * *